(12) United States Patent
Wang et al.

(10) Patent No.: US 10,849,122 B2
(45) Date of Patent: Nov. 24, 2020

(54) CACHE-BASED DATA TRANSMISSION METHODS AND APPARATUSES

(71) Applicant: Samsung Electronics Co., Ltd., Suwon-si (KR)

(72) Inventors: Hong Wang, Beijing (CN); Lixiang Xu, Beijing (CN); Chengjun Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 16/410,737

(22) Filed: May 13, 2019

(65) Prior Publication Data

US 2019/0268891 A1    Aug. 29, 2019

Related U.S. Application Data

(63) Continuation of application No. 15/113,790, filed as application No. PCT/KR2015/000471 on Jan. 16, 2015, now Pat. No. 10,292,152.

(30) Foreign Application Priority Data

Jan. 24, 2014    (CN) .......................... 2014 1 0036710

(51) Int. Cl.
*H04W 72/04*    (2009.01)
*H04L 29/08*    (2006.01)

(52) U.S. Cl.
CPC ....... *H04W 72/044* (2013.01); *H04L 67/2842* (2013.01)

(58) Field of Classification Search
CPC .......................... H04W 72/044; H04L 67/2842
See application file for complete search history.

(56) References Cited

U.S. PATENT DOCUMENTS 6,651,153 B1 *  11/2003  Orfali ................. G06F 11/3447
                                                        711/133
7,017,009 B2 *  3/2006   Okamura ............ G06F 12/0888
                                                        711/128
(Continued)

FOREIGN PATENT DOCUMENTS

CN          101193408 A        6/2008
CN          101221585 A        7/2008
(Continued)

OTHER PUBLICATIONS

Office Action dated Dec. 5, 2018 in connection with Chinese Patent Application No. 201410036710.X, 20 pages.

(Continued)

*Primary Examiner* — Michael J Moore, Jr.

(57) ABSTRACT

The present disclosure discloses cache-based data transmission methods and apparatuses. The method is implemented as follows. An apparatus where a caching node is located reports a caching capability to a network side, and the caching node is configured to cache data. The network side sends a cache indicating parameter to the apparatus where the caching node is located, and maintains a data list. Wherein, the cache indicating parameter is configured to control the caching node to cache the data which has the property of high repetition probability and/or high cache utilization, and the data list is a list of the data cached in the caching node. When the caching node has cached data requested by a UE, the UE obtains the requested data from the caching node.

20 Claims, 10 Drawing Sheets

(56) References Cited

U.S. PATENT DOCUMENTS

| | | | | |
|---|---|---|---|---|
| 7,752,625 | B2* | 7/2010 | Larson | G06F 9/468 |
| | | | | 718/104 |
| 10,292,152 | B2* | 5/2019 | Wang | H04W 72/044 |
| 2002/0107934 | A1* | 8/2002 | Lowery | H04L 43/16 |
| | | | | 709/213 |
| 2002/0138551 | A1* | 9/2002 | Erickson | H04L 67/42 |
| | | | | 709/203 |
| 2004/0093466 | A1 | 5/2004 | Hull | |
| 2005/0044570 | A1* | 2/2005 | Poslinski | H04N 21/44016 |
| | | | | 725/48 |
| 2005/0071568 | A1 | 3/2005 | Yamamoto et al. | |
| 2006/0155819 | A1* | 7/2006 | Grabinar | H04L 67/02 |
| | | | | 709/213 |
| 2008/0133830 | A1 | 6/2008 | Nitta et al. | |
| 2008/0281965 | A1 | 11/2008 | Zhong et al. | |
| 2009/0132680 | A1 | 5/2009 | Yamamoto et al. | |
| 2009/0144431 | A1 | 6/2009 | Kisel et al. | |
| 2011/0040893 | A1 | 2/2011 | Karaoguz et al. | |
| 2011/0106952 | A1 | 5/2011 | Doppler et al. | |
| 2012/0110118 | A1 | 5/2012 | Luna et al. | |
| 2012/0315945 | A1 | 12/2012 | Geary et al. | |
| 2013/0073671 | A1 | 3/2013 | Nagpal et al. | |
| 2013/0247118 | A1 | 9/2013 | Oyman | |
| 2013/0324114 | A1 | 12/2013 | Raghothaman et al. | |
| 2014/0045476 | A1 | 2/2014 | Anthony et al. | |
| 2014/0153504 | A1 | 6/2014 | Wang et al. | |
| 2016/0029424 | A1 | 1/2016 | Li et al. | |
| 2016/0295419 | A1 | 10/2016 | Avestimehr et al. | |

FOREIGN PATENT DOCUMENTS

| | | |
|---|---|---|
| CN | 100484148 C | 4/2009 |
| CN | 101431534 A | 5/2009 |
| CN | 102497389 A | 6/2012 |
| WO | 2013/038056 A1 | 3/2013 |
| WO | 2013/171115 A1 | 11/2013 |

OTHER PUBLICATIONS

International Search Report dated Apr. 27, 2015 in connection with International Patent Application No. PCT/KR2015/000471, 4 pages.
Written Opinion of the International Searching Authority dated Apr. 27, 2015 in connection with International Patent Application No. PCT/KR2014/000471, 9 pages.

* cited by examiner

CACHE-BASED DATA TRANSMISSION METHODS AND APPARATUSES

CROSS-REFERENCE TO RELATED APPLICATIONS AND PRIORITY CLAIM

This application is a continuation of U.S. patent application Ser. No. 15/113,790 filed on Jul. 22, 2016, which is a 371 of International Application No. PCT/KR2015/000471 filed on Jan. 16, 2015, which claims priority to Chinese Patent Application No. 201410036710.X filed on Jan. 24, 2014, the disclosures of which are herein incorporated by reference in their entirety.

BACKGROUND

1. Field

The present disclosure relates to radio communication technologies, and more particularly to cache-based data transmission methods and apparatuses.

2. Description of Related Art

Mobile communication system now pays close attention to high-speed data services and user experiences. For example, both a Long Term Evolution (LTE) system corresponding to Evolved Universal Terrestrial Radio Access (E-UTRA) protocol specified by 3rd Generation Partnership Project (3GPP) and a LTE-Advanced system provide high-speed mobile data services. By means of Carrier Aggregation (CA) technology, the peak rate of the LTE-A system may exceed 1 Gbps. Moreover, through improving the architecture of the LTE system, the number of network nodes in the LTE-A system is reduced, and then end-to-end delay is improved. Accordingly, compared with the previous 3G systems, the LTE-A system may provide better user experiences.

FIGS. 1A and 1B are diagrams illustrating the structure of System Architecture Evolution (SAE) of 3GPP LTE system. Such flat and all-IP structure is convenient for obtaining data.

User Equipment (UE) 101 is a terminal device for receiving data.

Evolved Universal Terrestrial Radio Access Network (E-UTRAN) 102 is a radio access network which includes an evolved Node B (eNodeB/eNB) for providing a radio interface for the UE. eNodeBs are connected to each other through an X2 interface. The E-UTRAN is connected to an Evolved Packet Core (EPC) network through an S1 interface.

The EPC network is responsible for overall control of UE and bearer establishment. A Mobile Management Entity (MME) 103 is configured to manage mobility contexts, session contexts and security information of the UE. A Serving Gateway (SGW) 104 is configured to provide functions of User Plane (UP). The MME 103 and the SGW 104 may be in the same physical entity.

A Packet Gateway (PGW) 105 is configured to implement charging and legal monitoring functions. The PGW 105 and the SGW 104 may be in the same physical entity.

A Policy and Charging Rules Function (PCRF) 106 is configured to provide QoS policies and charging rules.

A Service GPRS Supporting Node (SGSN) 108 is a network node device for providing routing for data transmission in a Universal Mobile Telecommunications System (UMTS).

A Home Subscriber Server (HSS) 109 is a home subsystem of the UE and is configured to protect user information including the current location of the UE, the address of a serving node, user security information and packet data contexts of the UE.

As well known, transmission capacity in a communication system is limited by bandwidth resources. Especially, radio spectrum used for mobile services becomes scarce increasingly, while mobile Internet is developed rapidly, and thus a mobile communication network has a growing need in providing a high-speed multimedia service for users. Accordingly, how to transmit massive user data with high efficiency for the purpose of relieving the load pressure of the radio access network, transport network and bearer network caused by ever-growing mobile traffic increase has become an urgent issue. For example, the load pressure may include the transmission pressure of LTE-Uu air interface of the radio access network, the transmission pressure of the backhaul link between the radio access network and a core network and the transmission pressure of the link between the radio access network and an operator network/Internet.

Conventionally, the physical capacity of network may be enlarged to address the increase of mobile traffic. For example, more spectrum can be added, Multi-input Multi-output (MIMO) transmission technology may be improved to increase spectrum efficiency, the number of base stations/cells may be increased, more micro-cells/small cells may be established and fiber capacity may be improved etc. However, these conventional solutions for solving the problem caused by the increase of mobile traffic all dramatically increase the establishment costs of operator networks, that is to say, probably revenue cannot scale with the increase of data volume. However, coupling the increasing of traffic volume with physical capacity increasing is simply formulated under the assumption that that data contents transmitted by different users are different.

However, recent analysis reveals that in massive data transmitted in the mobile communication network, many data contents hold a large number of users' common interest. For example, these interesting data contents may be popular multimedia data such as hit series, sports events and important news. If these data contents are transmitted on an air interface through a conventional point-to-point transmission mode, resources may be wasted. For example, a separate link is established between an eNodeB and a UE in the LTE system, and a unicast mode is adopted. In order to improve the efficiency of radio spectrum of air interface, a Multimedia Broadcast and Multicast Service (MBMS) may be used to transmit data in the LTE system. Multiple UEs may obtain data from an eNodeB through one link, which may reduce the transmission pressure of air interface to some degree. However, there is still a problem, that is, these users may need the data at different time points. Besides the transmission pressure of air interface, the increase of mobile traffic causes the transmission pressure of backhaul link, where data contents with high popularity and long life cycle are transmitted repeatedly between the radio access network and a network data center, thereby causing the unnecessary waste of link resources.

At present, study item of Device to Device (D2D) direct communication technology has been approved by 3GPP and is becoming a candidate evolution direction of the LTE-A system because of its great potential value in a public safety field and a general civilian communication field. During a D2D communication process, it is an important step to find a D2D terminal. Only if this step is performed, a communication initiator terminal having D2D communication requirements may find other D2D terminals within an effective distance. The effective distance refers to a coverage range of D2D communication capability of the communication initiator terminal. If there are one or more target terminals within the effective distance, the communication initiator terminal may establish a communication link with the one or more target terminals and perform D2D communication through a series of subsequent processes. At present, 3GPP has begun to specify a mutual discovery mechanism and a D2D communication mechanism with the assistance of the LTE system. If all D2D terminals capable of D2D communication within a certain range are referred to a D2D group, the D2D terminals in the D2D group may share data directly. When a D2D terminal has obtained and cached data holding many users' interest, other D2D terminals may obtain the data from the cache of the D2D terminal. In this way, the load pressure of network may be relieved.

SUMMARY

Embodiments of the present disclosure provides a cache-based data transmission method and apparatus, thereby relieving the load pressure of communication networks caused by the increase of traffic, shortening a transmission path of data contents, and accordingly improving user experiences.

A cache-based data transmission method provided by an embodiment of the present disclosure includes:

reporting, by an apparatus where a caching node is located, a caching capability to a network side, and the caching node being configured to cache data;

sending, by the network side, a cache indicating parameter to the apparatus where the caching node is located, and maintaining a data list; the cache indicating parameter being configured to control the caching node to cache the data, the data list being a list of the data cached in the caching node; and when the caching node has cached data requested by a User Equipment (UE), obtaining, by the UE, the requested data from the caching node.

A cache-based data transmission method provided by another embodiment of the present disclosure includes:

reporting, by an apparatus where a caching node is located, a caching capability to a network side;

receiving, by the apparatus where the caching node is located, a cache indicating parameter from the network side, caching the data according to the cache indicating parameter received;

when the caching node has cached data requested by a User Equipment (UE), sending, by the apparatus where the caching node is located, the requested data to the UE.

The apparatus where the caching node is located is a base station or a UE.

When the apparatus where the caching node is located is the base station, determining whether the caching node has cached the data requested by the UE includes:

obtaining an identification (ID) of the requested data, or a service type and service description information of the requested data, from a Radio Resource Control (RRC) message; and determining, according to the obtained ID of the requested data or according to the obtained service type and service description information of the requested data, whether the caching node has cached the requested data.

When the apparatus where the caching node is located is the base station, the method further includes:

receiving, by the base station, a transmission mode indicating information from the network side, and sending the requested data to the UE according to a transmission mode indicated by the transmission mode indicating information; the transmission mode being a unicast mode or a multicast mode.

When the apparatus where the caching node is located is the UE and proximal to the UE requesting the data, the method further includes:

establishing, by the apparatus where the caching node is located, direct communication with the UE requesting the data, and sending the requested data through the direct communication to the UE requesting the data.

The caching the data according to the cache indicating parameter includes:

caching the data; or caching the data and recording caching time of the data, and when the caching time expires, deleting the data; or caching the data, and deleting existing data in the caching node according to the cache indicating parameter; or caching the data, and deleting data first cached in the caching node according to a time order when the caching node overflows.

A cache-based data transmission apparatus provided by an embodiment of the present disclosure includes a capability reporting module, a caching node and a data providing module;

the capability reporting module is configured to report a caching capability to a network side;

the caching node is configured to receive a cache indicating parameter from the network side, and cache data according to the cache indicating parameter; and the data providing module is configured to send data requested by a User Equipment (UE) to the UE when the caching node has cached the requested data.

A cache-based data transmission method provided by another embodiment of the present disclosure includes:

receiving a caching capability reported by an apparatus where a caching node is located;

sending a cache indicating parameter to the apparatus where the caching node is located, and maintaining a data list; the cache indicating parameter being configured to control the caching node to cache data, the data list being a list of the data cached in the caching node; and determining a transmission path of data requested by a User Equipment (UE) according to whether the caching node has cached the requested data.

The cache indicating parameter is received from a data analyzing entity, is determined according to popularity, size and/or life cycle of the data by the data analyzing entity, which represents data repetition transmission probability and/or cache utilization; or the cache indicating parameter is set according to a data property parameter received from a data analyzing entity and according to a predefined determining standard, represents data repetition transmission probability and/or cache utilization; the data property parameter comprises popularity, size and/or life cycle of the data.

The sending the cache indicating parameter to the apparatus where the caching node is located includes:

when the apparatus where the caching node is located is a base station, sending, by a Mobile Management Entity (MME), the cache indicating parameter to the base station through a data bearer establishing process; and when the apparatus where the caching node is located in a UE, sending, by the MME, the cache indicating parameter to the UE through a base station which the UE is attached to.

Controlling the caching node to cache the data according to the cache indicating parameter includes:

indicating to-be-cached data according to the cache indicating parameter; or indicating to-be-cached data and caching time of the to-be-cached data according to the cache indicating parameter, and when the caching time expires, deleting, by the caching node, the data; or indicating to-be-cached data according to the cache indicating parameter, and indicating to-be-deleted existing data in the caching node.

Determining whether the caching node has cached the requested data includes:

obtaining an identification (ID) of the requested data, or a service type and service description information of the requested data, from a Radio Resource Control (RRC) message; and determining, according to the obtained ID of the requested data or according to the obtained service type and service description information of the requested data, whether the caching node has cached the requested data.

Determining the transmission path of the data requested by the UE according to whether the caching node has cached the requested data includes:

when the caching node has cached the requested data and the apparatus where the caching node is located is a base station connected to the UE, notifying the base station to send the requested data to the UE;

when the caching node has cached the requested data and the apparatus where the caching node is located is a UE proximal to the UE requesting the data, configuring direct communication between the two UEs, and the requested data is sent through the direct communication; and when the caching node has not cached the requested data, obtaining the requested data from a network side, and routing the requested data to the base station connected to the UE via a gateway, and sending the requested data to the UE.

A cache-based data transmission apparatus provided by another embodiment of the present disclosure includes a capability receiving module, a cache indicating module and a transmission controlling module;

the capability receiving module is configured to receive a caching capability reported by an apparatus where a caching node is located;

the cache indicating module is configured to send a cache indicating parameter to the apparatus where the caching node is located, and maintain a data list; the cache indicating parameter is configured to control the caching node to cache data, the data list is a list of the data cached in the caching node; and the transmission controlling module is configured to determine a transmission path of data requested by a User Equipment (UE) according to whether the caching node has cached the requested data.

As can be seen from the embodiments of the present disclosure, through caching data contents with high popularity and/or long life cycle by a caching node, a transmission path of the data contents may be shortened, and the load pressure of communication networks caused by massive data may be relieved.

DETAILED DESCRIPTION

In order to make the object, technical solution and merits of the present disclosure clearer, the present disclosure will be illustrated in detail hereinafter with reference to the accompanying drawings and specific embodiments.

Inventors of the present disclosure observed that analyzing data contents and optimizing a transmission path according to the popularity, size and life cycle of the data contents is a low-cost and high-efficiency mode for relieving the transmission pressure of communication networks and improving user experiences. Since cache cost would be greatly lower than transmission cost in the near future, an embodiment of the present disclosure provides a cache-based data transmission solution. In this solution, a caching node is used to cache data contents with high popularity and/or long life cycle, thereby shortening a transmission path of the data contents and relieving the load pressure of communication networks caused by massive data. In this present disclosure, the popularity of the data contents may refer to the hit count of the data contents, or refer to the supposed downloads of the data contents, for example, a new movie release video and a sports events video.

Figure 1A:
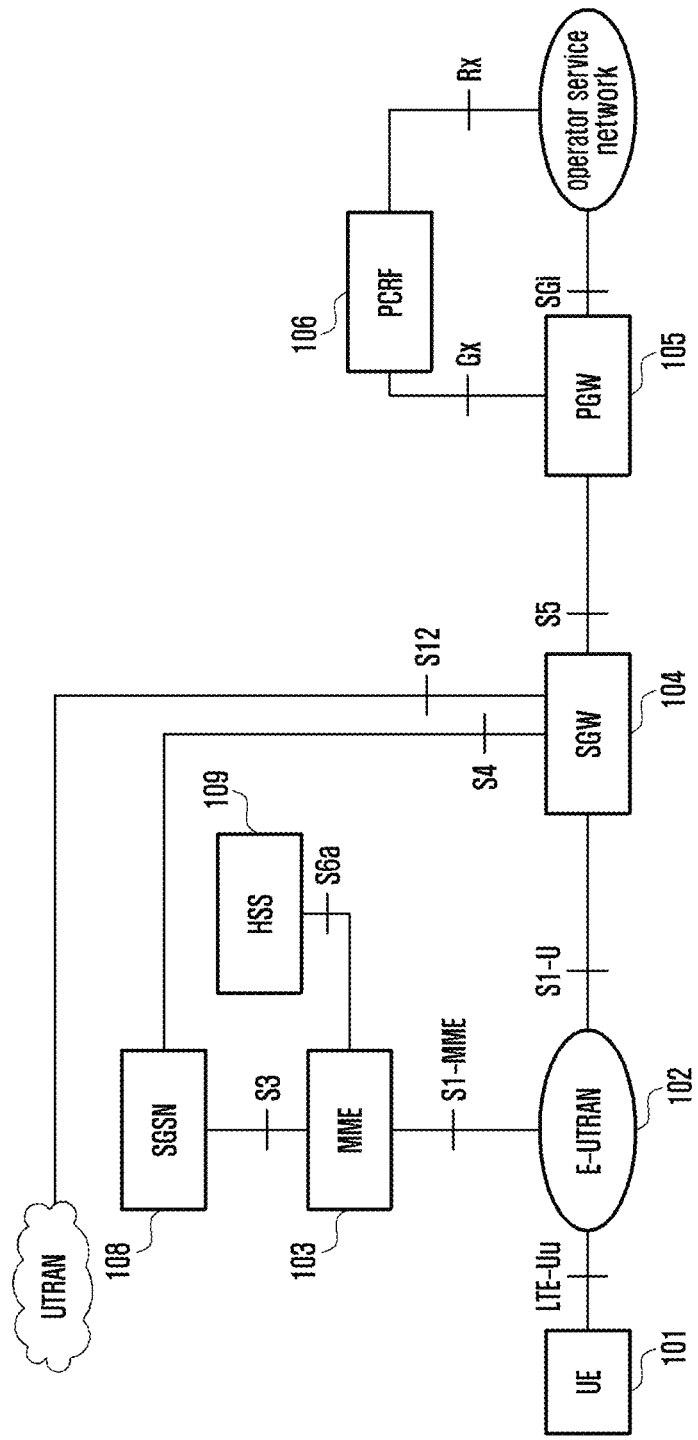
FIGS. 1A and 1B are diagrams illustrating the structure of SAE of 3GPP LTE system.
Figure 1B:
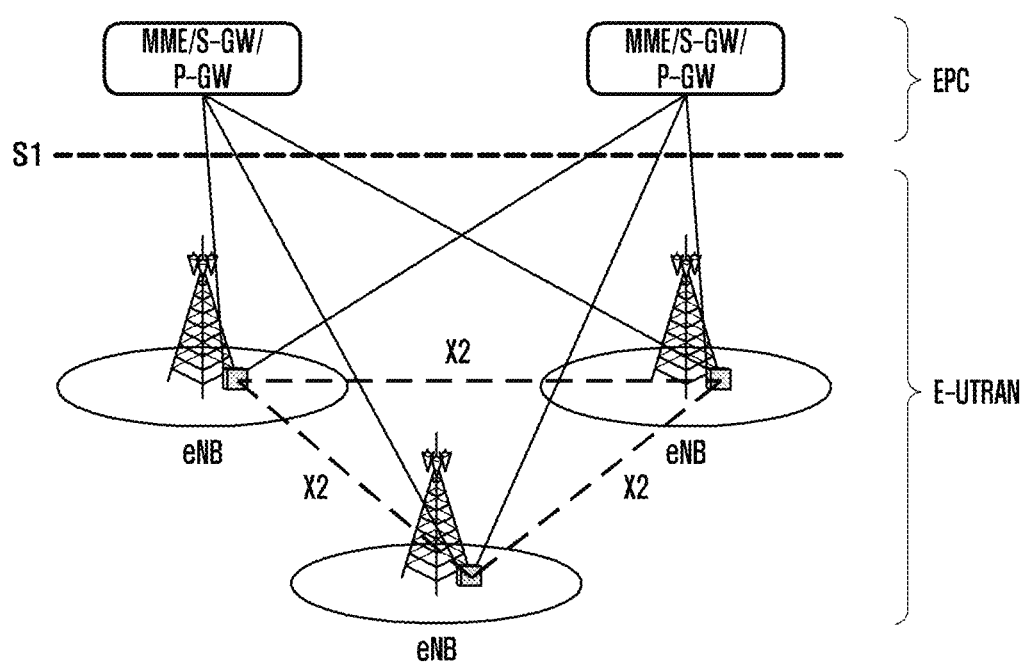
Figure 2:
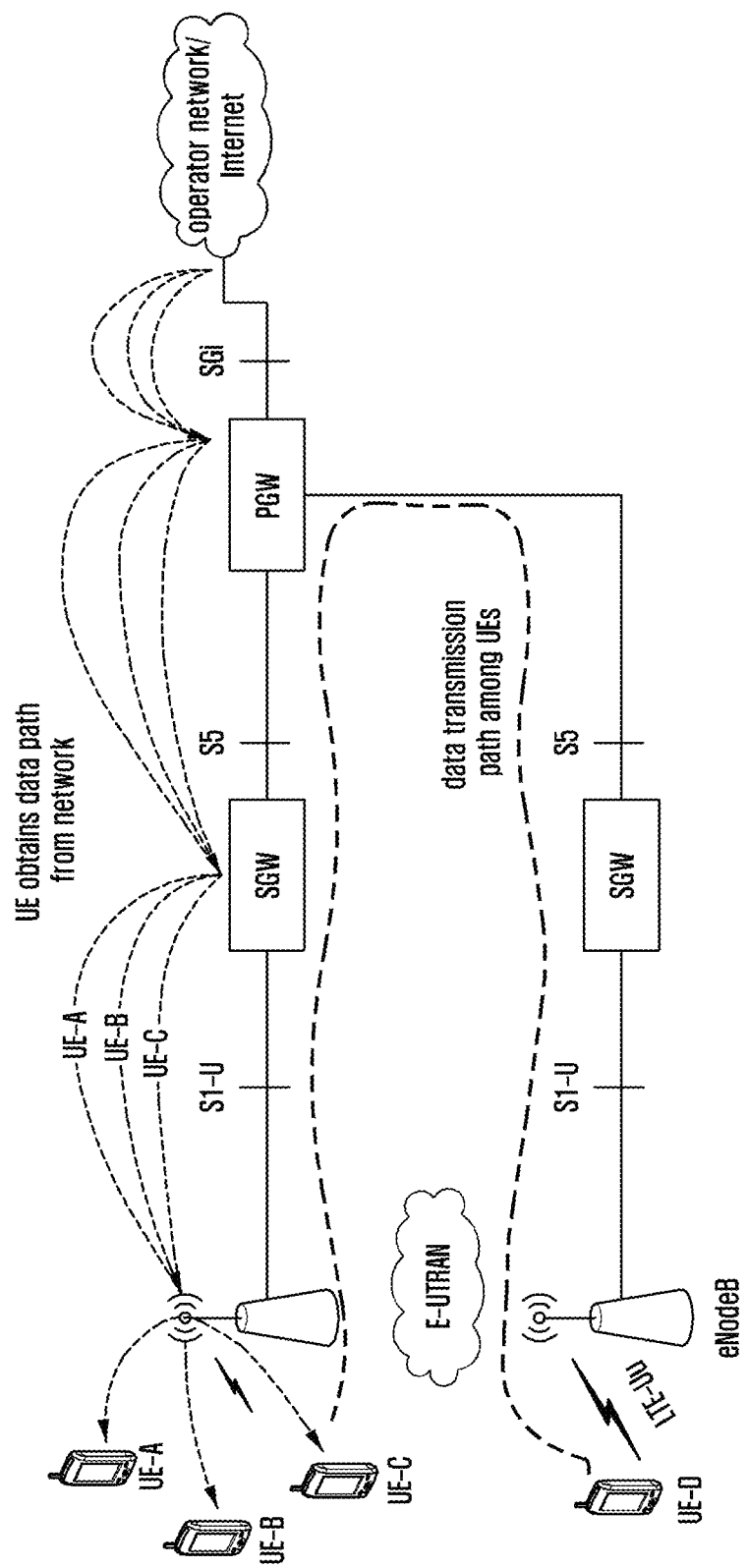
FIG. 2 is a diagram illustrating a transmission path of user plane data in the LTE system.

FIG. 2 is a diagram illustrating a transmission path of user plane data in the LTE system. Three UEs, for example, UE-A, UE-B and UE-C, request Internet for the same data. For each UE, the requested data must pass three nodes including a Packet Gateway (PGW), a Serving Gateway (SGW) and an eNodeB. And finally, the eNodeB sends the requested data to each UE through an radio air interface. As shown in FIG. 2, UE-D and UE-C are proximal to each other, and UE-D intends to send very popular data to UE-C. Though UE-D and UE-C are proximal to each other, the data cannot be sent to UE-C unless the data passes through the SGW, the PGW and the eNodeB, which greatly wastes the resources of transmission links connected to these nodes. Moreover, since the data is also sent on the air interface, the resources of air interface are also wasted. It should be noted that, FIG. 2 shows two eNodeBs for convenience, but does not represent two UEs must be connected to different eNodeBs. In actual applications, the two UEs may be connected to different cells or the same cell under the same eNodeB, or connected to proximal eNodeBs.

Figure 3:
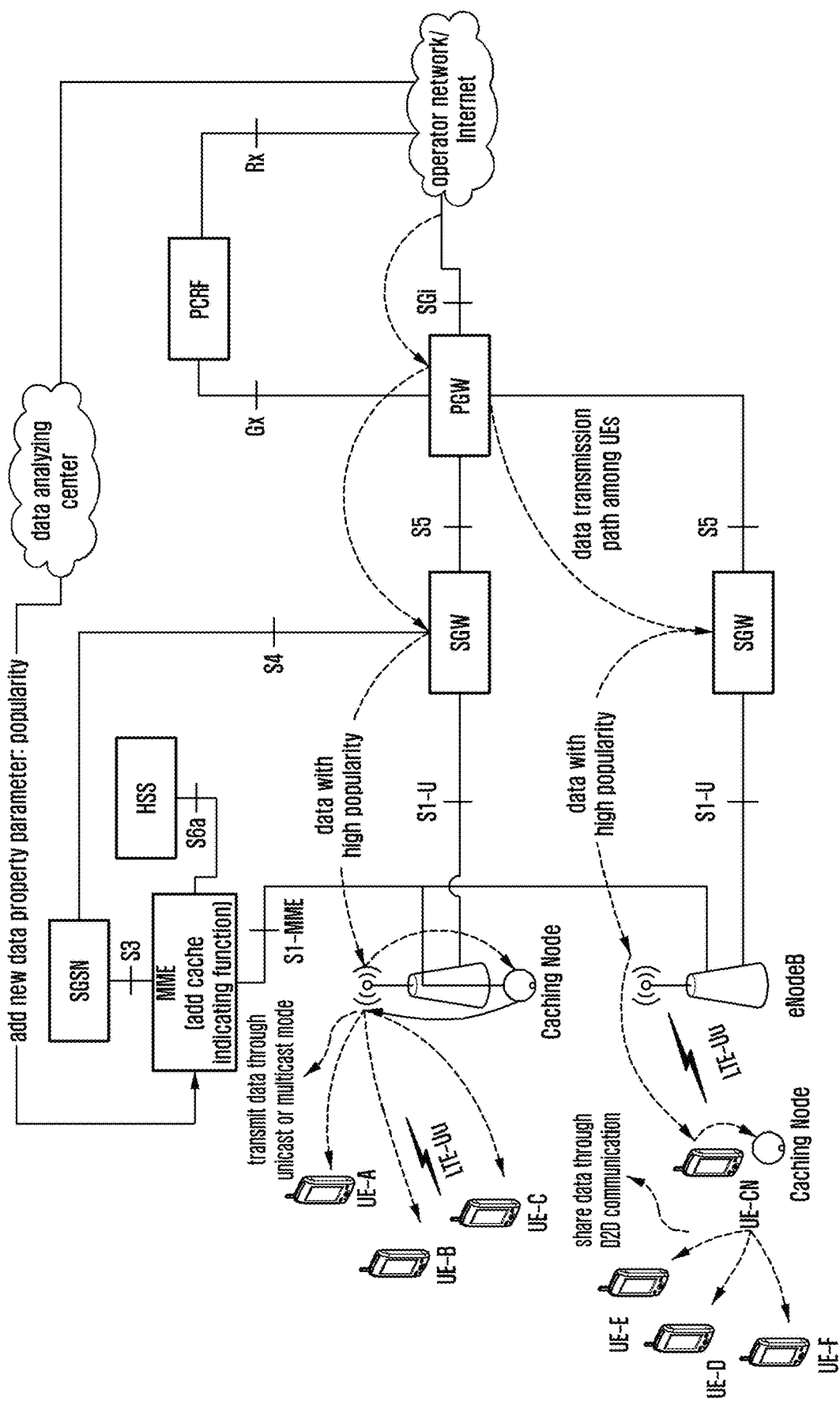
FIG. 3 is a diagram illustrating a cache-based data transmission method according to an embodiment of the present disclosure.

An embodiment of the present disclosure provides a cache-based data transmission method. FIG. 3 is a diagram illustrating the cache-based data transmission method according to the embodiment of the present disclosure. The method is implemented as follows.

A caching node (a logical title) is set on an eNodeB or a UE, and is configured to cache data. In particular the data has high repetition transmission probability and/or high cache utilization. The apparatus where the caching node is located transfers a caching capability to a network side. The network side maintains a data list cached in the caching node. The network side sends a cache indicating parameter to the apparatus where the caching node is located. The cache indicating parameter is configured to control a caching operation of the caching node. The data with high repetition transmission probability means that the probability of repeatedly sending the data is high. For example, a dimensionality such as popularity may be used to represent the number of operations for requesting the data in a period of time. The cache utilization may be determined according to three dimensionalities including the popularity, size and life cycle of the data. For example, data contents having similar popularity, different sizes and different life cycles may have higher cache utilization, but may not have the highest repetition transmission probability. In an actual application, it may be determined according to the popularity, size and life cycle of data whether to cache the data. In an another application, it may be determined according to the popularity of data whether to cache the data. The complexity of the former application is different from the complexity of the latter application.

In an implementation, a data analyzing entity is set and is configured to analyze data and give the data with a data property parameter such as popularity, size and life cycle related to the repetition transmission probability and the cache utilization. The data property parameter may be used to set the cache indicating parameter by the network side. The data analyzing entity transfers the data property parameter to a network entity configured to overall control the UE and the caching node. For example, the MME in the core network shown in FIG. 3 may configure and send the cache indicating parameter according to the data property parameter.

In another implementation, the data analyzing entity analyzes data to generate the data property parameter. The data property parameter may be used as the cache indicating parameter to indicate whether an apparatus where the caching node is located may cache the data. The data analyzing entity transfers the data property parameter to the network entity configured to overall control the UE and the caching node. For example, the MME in the core network shown in FIG. 3 may directly transfer the data property parameter to indicate whether the caching node may cache the data, without configuring the cache indicating parameter according to the data property parameter. In this implementation, the data property parameter is the cache indicating parameter.

For data whose data property parameter indicates that the data has high repetition transmission probability, the network side indicates, according to the cache indicating parameter, the caching node to cache the data, or indicates the caching node to cache the data and indicates caching time of the data (that is, the deleting time of the data), or indicates the caching node to cache the data and indicates to delete designated data in the caching node. If the cache indicating parameter does not indicate the deleting time of the data, the network side may indicate, according to a caching state and the cache indicating parameter, the caching node to delete existing data when the caching node caches the data. At the same time, the network side updates the data list in the caching node. Or, the network side updates the data list cached in the caching node starting from cache starting time according to a time order when a predefined cache overflows. If it is determined that the data does not need to be cached, the cache indicating parameter may be default.

When requesting for data, the UE may report an identification (ID) of the requested data. The network side may enquire, according to the ID of the requested data, whether the data is cached, and then determines a transmission path of the requested data.

1) If it is determined according to the ID of the requested data that the caching node has cached the data and the apparatus where the caching node is located is an eNodeB connected to the UE, the data is obtained from the caching node and sent to the UE.

2) If it is determined according to the ID of the requested data that the caching node has cached the data and the apparatus where the caching node is located is a UE proximal to the UE, the network side configures a D2D direct communication mechanism, obtains the data from the caching node and sends the data to the UE.

3) If it is determined according to the ID of the requested data that the caching node has not cached the data, the network side obtains the data from an operator network/Internet according to a routine mode, then sends the data to the eNodeB via a gateway, and finally sends to the UE.

The network side may determine a sending mode of the requested data according to the ID of the requested data. For example, the network side counts the ID of the requested data, sets a threshold, and notifies the eNodeB of the threshold and a counting result. According to the threshold and the counting result, the eNodeB decides to use a unicast mode or a multicast mode to send the data. If the multicast mode is used, the network side needs to notify the UE of that the apparatus where the caching node is located uses multicast configuration.

The solution of the present disclosure will be illustrated in detail hereinafter with reference to several embodiments.

A first embodiment is implemented as follows.

In this embodiment, a caching node is located in an eNodeB. A cache-based data transmission method in a LTE system is described with reference to FIGS. 3 and 4.

Figure 4:
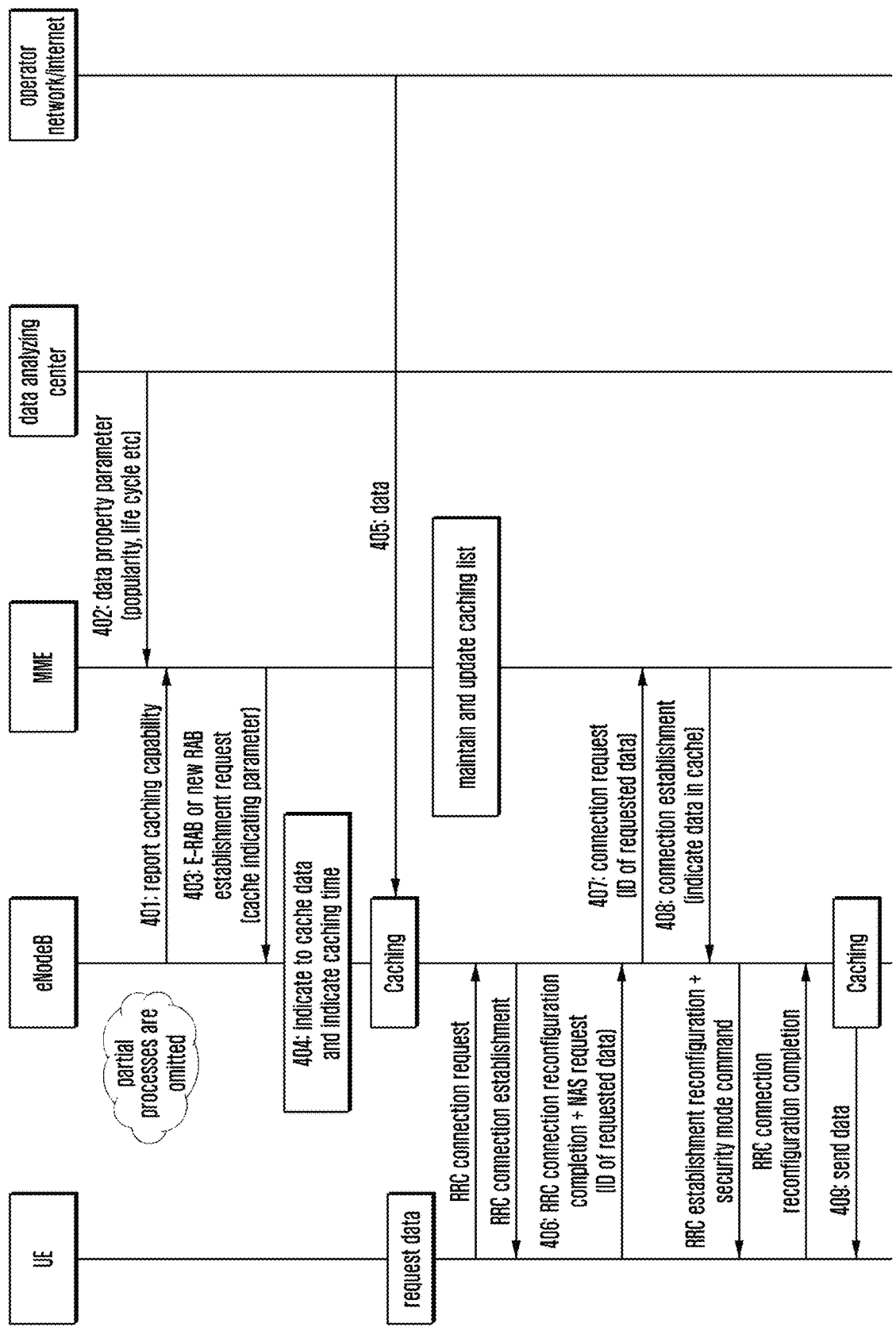
FIG. 4 is a flowchart illustrating a cache-based data transmission method according to a first embodiment of the present disclosure.

FIG. 4 is a flowchart illustrating a cache-based data transmission method according to the first embodiment of the present disclosure. The method includes following blocks.

At block 401, a caching node is located in an eNodeB, and the eNodeB reports a caching capability through an interface connected to a MME. The caching capability includes cache size configuration information.

At block 402, a data analyzing center analyzes data of an operator network/Internet, gives the data with a data property parameter such as popularity and life cycle related to data repetition transmission probability and/or cache utilization, and sends the data property parameter to the MME. Or, the data analyzing center performs general analysis for the data, and thus the data property parameter sent to the MME is a cache indicating parameter, thereby simplifying the processing of the MME.

At blocks 403 to 405, when the MME receives the data property parameter from the data analyzing center, the MME performs general analysis for the data property parameter, sets a determining standard, and sets the cache indicating parameter according to the data property parameter. When a UE requests data with high repetition transmission probability and/or high cache utilization for the first time, the MME sends the cache indicating parameter to the eNodeB during a process of establishing an E-UTRAN Radio Access Bearer (E-RAB) for the UE by the MME and the eNodeB. For example, the cache indicating parameter may be contained in an initial context establishing request message or an E-RAB establishing request message. The cache indicating parameter may be default, which may be deemed that the data does not need to be cached. The UE and a serving cell under the eNodeB establish a RRC connection. A process of establishing a context for the UE by the MME and the eNodeB is similar to that in the LTE system, and thus is omitted in FIG. 4.

Or, without a user request, the network side pushes the data with high repetition transmission probability and/or high cache utilization to the caching node in the eNodeB in advance. The MME and the eNodeB introduce a new RAB to indicate the caching node to cache the pushed data. As shown in FIG. 3, when the data reaches the eNodeB from the operator network/Internet via a PGW and a SGW, the cache indicating parameter indicates to cache the data to the caching node in the eNodeB and indicates the caching time of the data. When the caching time expires, the caching node deletes the data. The MME maintains a data list cached in the caching node. When the caching time expires, the MME updates the data list. In order to make the eNodeB find data needed by the UE from cached data, the MME needs to send a service type and service description information to the eNodeB, and the eNodeB saves the service type and the service description information.

At block 406, as shown in FIG. 4, when the UE accesses a network and requests for data, the UE sends the service type of the requested data to the eNodeB. The service type of the requested data is contained in a Radio Resource Control (RRC) message. The RRC message further contains the service description information. According to the service description information, detailed contents of the requested data may be learned, for example, a name of a certain movie.

At block 407, the eNodeB sends an initial UE message to the MME, so as to send the service type and the service description information of the requested data to the MME.

At block 408, the MME enquires the data list cached in the caching node according to the service type and service description information of the requested data. When the MME finds that the requested data has been cached in the caching node of the eNodeB connected to the UE, the MME indicates the eNodeB to send the data to the UE, without routing the data from the operator network/Internet via the PGW.

At block 409, the eNodeB sends the data to the UE.

As shown in FIG. 3, UE-A, UE-B and UE-C may directly obtain data from the caching node in the eNodeB, without the processing show in FIG. 2. In this way, it may be avoided to repeatedly send data with high popularity on a backhaul link, thereby relieving the load pressure of communication networks, shortening a transmission path of data contents and accordingly improving user experiences.

The MME may indicate, according to the number of UEs requesting for the data cached in the caching node of the eNodeB, the eNodeB to adopt a unicast mode or a multicast mode to send the data.

If the eNodeB may obtain the service type and the service description information of the requested data from the RRC message, the eNodeB may enquire whether it has cached the data. When the eNodeB has cached the data, the eNodeB obtains the data from the caching node of the eNodeB, and sends the data to the UE. The data does not need to be routed from the operator network/Internet via the PGW. UE-A, UE-B and UE-C may directly obtain data from the caching node of the eNodeB, without the processing show in FIG. 2. In this way, it may be avoided to repeatedly send data with high popularity on the backhaul link, thereby relieving the load pressure of communication networks, shortening the transmission path of data contents and accordingly improving user experiences.

A second embodiment is implemented as follows.

In this embodiment, a caching node is still located in an eNodeB. A cache-based data transmission method in a LTE system is described with reference to FIGS. 3 and 5.

Figure 5:
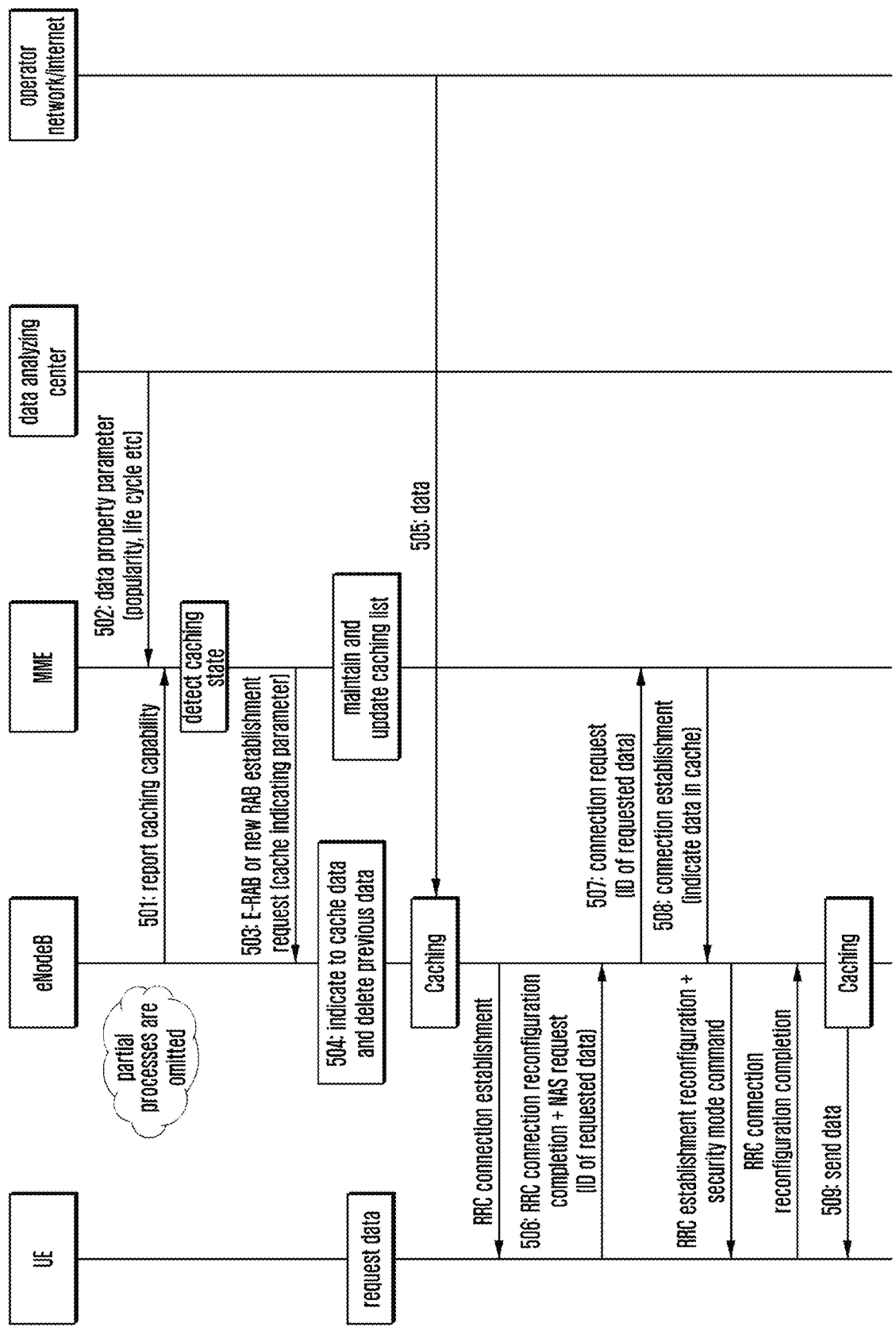
FIG. 5 is a flowchart illustrating a cache-based data transmission method according to a second embodiment of the present disclosure.

FIG. 5 is a flowchart illustrating a cache-based data transmission method according to the second embodiment of the present disclosure. The method includes following blocks.

At block 501, a caching node is located in an eNodeB, and the eNodeB reports a caching capability through an interface connected to a MME. The caching capability includes cache size configuration information.

At block 502, a data analyzing center analyzes data of an operator network/Internet, gives the data with a data property parameter such as popularity and life cycle related to data repetition transmission probability and/or cache utilization, and sends the data property parameter to the MME. Or, the data analyzing center performs general analysis for the data, and thus the data property parameter sent to the MME is a cache indicating parameter, thereby simplifying the processing of the MME.

At blocks 503 to 505, when the MME receives the data property parameter from the data analyzing center, the MME performs general analysis for the data property parameter, sets a determining standard, and sets the cache indicating parameter according to the data property parameter. When a UE requests data with high repetition transmission probability and/or high cache utilization for the first time, the MME sends the cache indicating parameter to the eNodeB during a process of establishing an E-RAB for the UE by the MME and the eNodeB. For example, the cache indicating parameter may be contained in an initial context establishing request message or an E-RAB establishing request message. The cache indicating parameter may be default, which may be deemed that the data does not need to be cached. The UE and a serving cell under the eNodeB establish a RRC connection. A process of establishing a context for the UE by the MME and the eNodeB is similar to that in the LTE system, and thus is omitted in FIG. 5.

Or, without a user request, the network side pushes the data with high repetition transmission probability and/or high cache utilization to the caching node in the eNodeB in advance. The MME and the eNodeB introduce a new RAB to indicate the caching node to cache the pushed data. As shown in FIG. 3, when the data reaches the eNodeB from the operator network/Internet via a PGW and a SGW, the cache indicating parameter indicates the caching node to cache the data, but does not indicate cache automatic deleting time of the data. Since an apparatus where the caching node is located reports the cache size configuration information when reporting the caching capability, the MME may learn a cache state. According to the caching state, the MME may indicate the caching node to delete existing data when caching the designated data. Or, the caching node may periodically report the caching state or trigger the reporting of the caching state when overflowing. The network side indicates, according to the caching state, the caching node to delete some data. The MME maintains a data list cached in the caching node. As shown in FIG. 5, the MME detects the caching state. When finding the caching capability is not enough, the MME indicates, through the cache indicating parameter, the caching node to delete the designated existing data and cache the data. The MME updates the data list cached in the caching node according to the newly cached data and the deleted data. Or, the network side updates the data list cached in the caching node starting from cache starting time according to a time order when a predefined cache overflows.

At block 506, as shown in FIG. 5, when the UE accesses a network and requests for data, the UE sends a service ID of the requested data to the eNodeB. The service ID of the requested data is contained in an RRC message.

At block 507, the eNodeB sends an initial UE message to the MME, so as to send the service ID of the requested data to the MME.

At block 508, the MME enquires the data list cached in the caching node according to the service ID of the requested data. When the MME finds that the requested data has been cached in the caching node of the eNodeB connected to the UE, the MME indicates the eNodeB to send the data to the UE, without routing the data from the operator network/Internet via the PGW.

At block 509, the eNodeB sends the data to the UE.

Further, the MME may indicate, according to the number of UEs requesting for the data cached in the caching node of the eNodeB, the eNodeB to adopt a unicast mode or a multicast mode to send the data.

Different from the solution of the first embodiment, the caching operation indicated by the caching indicating parameter does not indicate the deleting time of the data.

Similar to the first embodiment, if the eNodeB may obtain the ID of the requested data from the RRC message, the eNodeB may enquire whether it has cached the data. When the eNodeB has cached the data, the eNodeB obtains the data from the caching node of the eNodeB, and sends the data to the UE. The data does not need to be routed from the operator network/Internet via the PGW. UE-A, UE-B and UE-C may directly obtain data from the caching node of the eNodeB, without the processing show in FIG. 2. In this way, it may be avoided to repeatedly send data with high popularity on the backhaul link, thereby relieving the load pressure of communication networks, shortening the transmission path of data contents and accordingly improving user experiences.

A third embodiment is implemented as follows.

In this embodiment, a caching node is located in a UE. A cache-based data transmission method is described with reference to FIGS. 3 and 6.

Figure 6A:
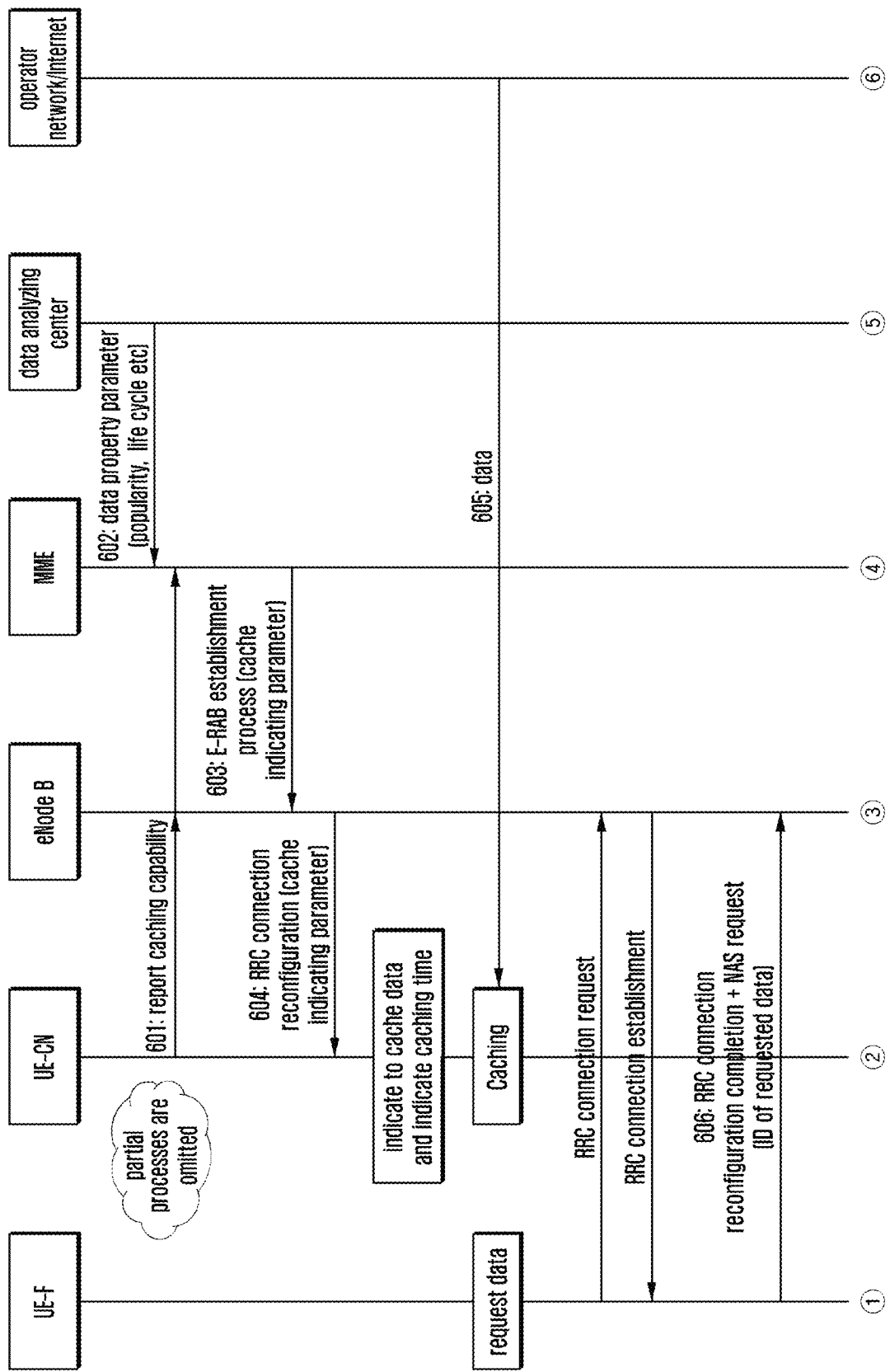
FIGS. 6A and 6B are flowcharts illustrating a cache-based data transmission method according to a third embodiment of the present disclosure.
Figure 6B:
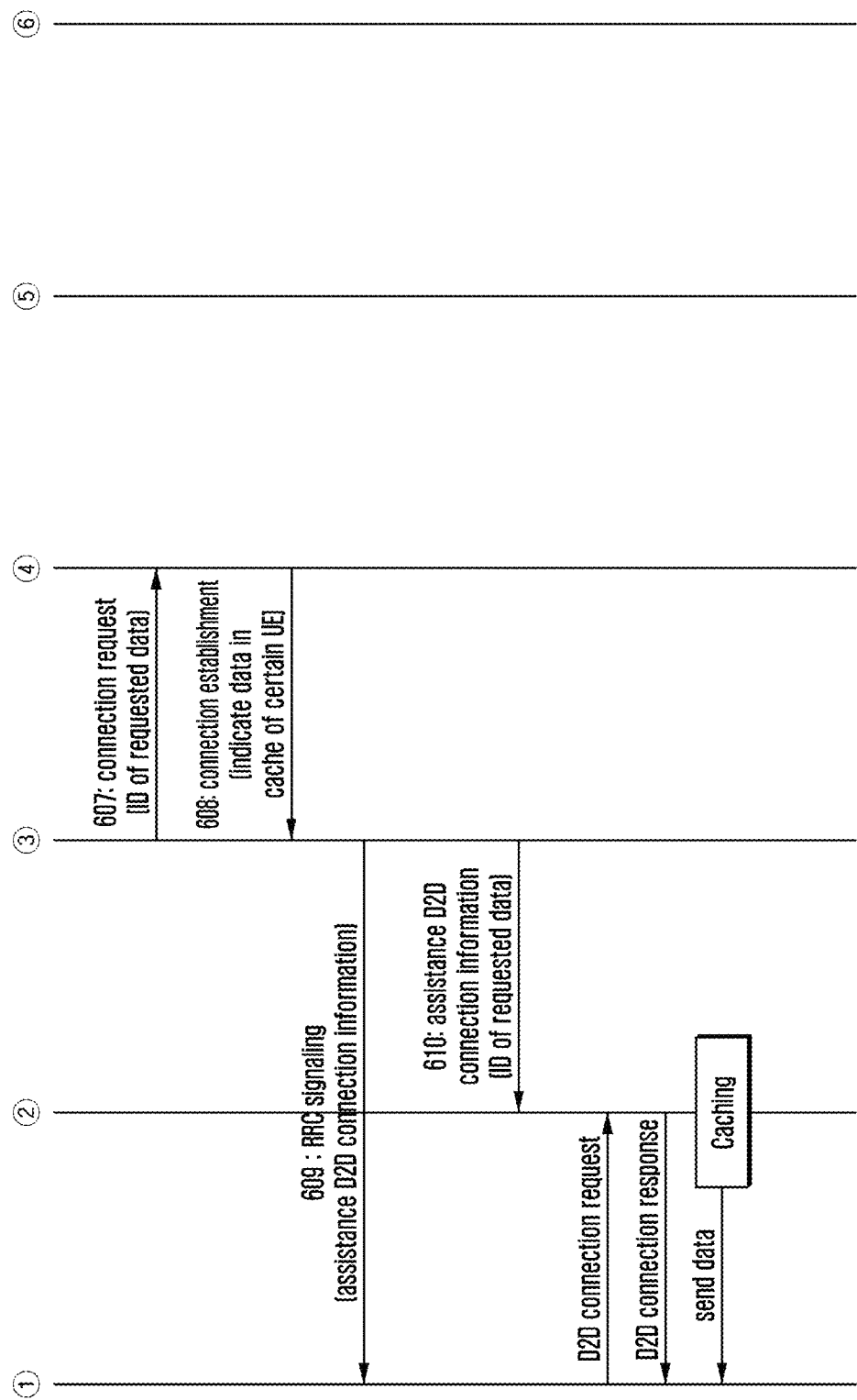

FIGS. 6A and 6B are flowcharts illustrating a cache-based data transmission method according to the third embodiment of the present disclosure. The method includes following blocks.

At block 601, a caching node is located in a UE (UE-CN shown in FIG. 6A), and the UE has been connected to a network. A RRC establishing process is similar to that in the LTE system and thus is omitted. UE-CN reports a UE capability to an eNodeB through the UE capability transfer of the LTE system. According to the embodiment of the present disclosure, a new UE capability indication is added to the UE capability to indicate whether the UE has a caching capability. The caching capability includes cache size configuration information. The eNodeB saves the capability information of the UE, and reports the capability information of the UE to the MME, which is the same as that in the LTE system, and is not illustrated herein.

At block 602, a data analyzing center analyzes data of an operator network/Internet, gives the data with a data property parameter such as popularity and life cycle related to data repetition transmission probability and/or cache utilization, and sends the data property parameter to the MME. Or, the data analyzing center performs general analysis for the data, and thus the data property parameter sent to the MME is a cache indicating parameter, thereby simplifying the processing of the MME.

At block 603, when the MME receives the data property parameter from the data analyzing center, the MME performs general analysis for the data property parameter, sets a determining standard, and sets the cache indicating parameter according to the data property parameter. When UE-CN requests data with high repetition transmission probability and/or high cache utilization for the first time, the MME sends the cache indicating parameter to the eNodeB during a process of establishing an E-RAB for the UE-CN by the MME and the eNodeB.

At block 604, the eNodeB transfers the caching indicating parameter to UE-CN through an RRC message.

The cache indicating parameter may be default, which may be deemed that the data does not need to be cached. UE-CN and a serving cell under the eNodeB establish a RRC connection. A process of establishing a context for the UE by the MME and the eNodeB is similar to that in the LTE system, and thus is omitted in FIGS. 6A and 6B.

At block 605, As shown in FIG. 3, when the data is sent to UE-CN from the operator network/Internet via a PGW, a SGW and an air interface, the cache indicating parameter indicates to cache the data to the caching node of UE-CN and indicates the caching time of the data. When the caching time expires, the caching node deletes the data. The MME maintains a data list cached in the caching node. When the caching time expires, the MME updates the data list.

At block 606, as shown in FIG. 6A, when another UE (for example, UE-F shown in FIG. 6A) accesses a network and requests for data, UE-F sends a service ID of the requested data to the eNodeB. The service ID of the requested data is contained in a RRC message.

At block 607, the eNodeB transfers the service ID of the requested data to the MME when establishing a connection request for UE-F together with the MME.

At block 608, the MME enquires, according to the ID of the requested data, the data list cached in the caching node. When finding the data requested by UE-F has been cached in the caching node of UE-CN proximal to UE-F, the MME indicates the eNodeB that the data has been cached in another UE of the eNodeB, that is, the data has been cached in the caching node of UE-CN.

At blocks 609 and 610, the eNodeB configures D2D direct communication for UE-CN and UE-F. The eNodeB sends assistance D2D connection information to UE-F and UE-CN, assists UE-F and UE-CN to find each other, configures D2D communication resources for them, and sends the ID of data requested by UE-F to UE-CN. In this way, UE-CN may send the data to UE-F through a LTE D2D mode.

As shown in FIG. 3, UE-CN is also proximal to other UEs, and thus, UE-CN and other UEs may be composed of a D2D group similar to a social network. UE-CN may make all UEs finding UE-CN receive data with high popularity according to the number of UEs requesting the data cached by UE-CN in the D2D group and through introducing a D2D multicast mode. Though D2D communication is direct communication between two devices, the D2D multicast mode may be implemented.

During the description for FIGS. 4 to 6, blocks have been numbered for convenience. The reference numbers are not used to represent the order of the blocks.

Based on the above methods, an embodiment of the present disclosure also provides an apparatus, which is illustrated with reference to the accompanying drawings.

Figure 7:
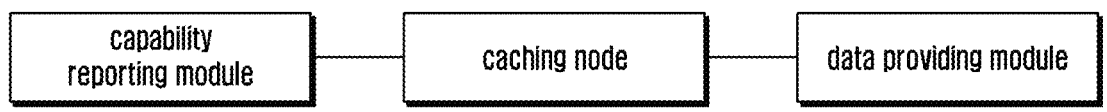
FIG. 7 is a diagram illustrating the structure of a cache-based data transmission apparatus according to an embodiment of the present disclosure.

FIG. 7 is a diagram illustrating the structure of a cache-based data transmission apparatus according to an embodiment of the present disclosure. A caching node is located in the apparatus. The apparatus includes a capability reporting module, a caching node and a data providing module.

The capability reporting module may report a caching capability to a network side.

The caching node may receive a cache indicating parameter from the network side, and cache data according to the cache indicating parameter. The data has high repetition transmission probability and/or high cache utilization.

The data providing module may send data requested by UE to the UE when the caching node has cached the requested data.

Figure 8:
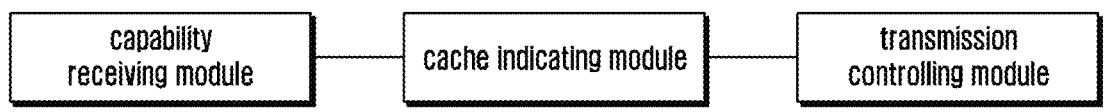
FIG. 8 is a diagram illustrating the structure of a cache-based data transmission apparatus according to another embodiment of the present disclosure.

FIG. 8 is a diagram illustrating the structure of a cache-based data transmission apparatus according to another embodiment of the present disclosure. The apparatus may be an entity at a network side, for example, a MME. The apparatus includes a capability receiving module, a cache indicating module and a transmission controlling module.

The capability receiving module may a caching capability reported by an apparatus where the caching node is located.

The cache indicating module may send a cache indicating parameter to an apparatus where the caching node is located, and maintain a data list. The cache indicating parameter may be used to control the caching node to cache data. The data list is a list of data cached in the caching node. The data has high repetition transmission probability and/or high cache utilization.

The transmission controlling module may determine a transmission path of data requested by a UE according to whether the caching node has cached the requested data.

The foregoing is only preferred embodiments of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for cache-based data transmission by an apparatus where a caching node is located, the method comprising:
    transmitting, to a network entity, information on a caching capability of the apparatus, the information including cache size configuration information;
    receiving, from the network entity, a cache indicating parameter indicating the caching node to delete previous data and to cache data when the caching capability of the apparatus is not enough; and
    caching the data based on the cache indicating parameter.

2. The method of claim 1, wherein the cache indicating parameter is determined based on a data property parameter and the information on the caching capability, and
    wherein the data property parameter includes at least one of a popularity of data, a size of data, and a life cycle of data.

3. The method of claim 1, wherein a data list cached in the caching node is updated according to newly cached data and the deleted previous data.

4. The method of claim 1, wherein the apparatus where the caching node is located is a base station or a user equipment (UE).

5. The method of claim 1, further comprising:
    transmitting, to the network entity, a connection request message including a service ID of requested data; and
    receiving, from the network entity, a connection establishment message indicating that the requested data has been cached in the caching node.

6. A method for cache-based data transmission by a network entity, the method comprising:
    receiving, from an apparatus where a caching node is located, information on a caching capability of the apparatus, the information including cache size configuration information;
    detecting a caching state of the caching node based on the cache size configuration information; and
    transmitting, to the apparatus where the caching node is located, a cache indicating parameter indicating the caching node to delete previous data and to cache data when the caching capability of the apparatus is not enough based on the caching state of the caching node.

7. The method of claim 6, wherein the cache indicating parameter is determined based on a data property parameter and the information on the caching capability, and
    wherein the data property parameter includes at least one of a popularity of data, a size of data, and a life cycle of data.

8. The method of claim 6, further comprising:
    updating a data list cached in the caching node according to newly cached data and the deleted previous data.

9. The method of claim 6, wherein the apparatus where the caching node is located is a base station or a user equipment (UE).

10. The method of claim 6, further comprising:
    receiving, from the apparatus where the caching node is located, a connection request message including a service ID of requested data; and
    transmitting, to the apparatus where the caching node is located, a connection establishment message indicating that the requested data has been cached in the caching node.

11. An apparatus where a caching node is located, the apparatus comprising:
    a transceiver; and
    a controller coupled with the transceiver and configured to control to:
        transmit, to a network entity, information on a caching capability of the apparatus, the information including cache size configuration information,
        receive, from the network entity, a cache indicating parameter indicating the caching node to delete previous data and to cache data when the caching capability of the apparatus is not enough, and
        cache the data based on the cache indicating parameter.

12. The apparatus of claim 11, wherein the cache indicating parameter is determined based on a data property parameter and the information on the caching capability, and
    wherein the data property parameter includes at least one of a popularity of data, a size of data, and a life cycle of data.

13. The apparatus of claim 11, wherein a data list cached in the caching node is updated according to newly cached data and the deleted previous data.

14. The apparatus of claim 11, wherein the apparatus where the caching node is located is a base station or a user equipment (UE).

15. The apparatus of claim 11, wherein the controller is configured to:
  transmit, to the network entity, a connection request message including a service ID of requested data, and
  receive, from the network entity, a connection establishment message indicating that the requested data has been cached in the caching node.

16. A network entity for cache-based data transmission, the network entity comprising:
  a transceiver; and
  a controller coupled with the transceiver and configured to control to:
    receive, from an apparatus where a caching node is located, information on a caching capability of the apparatus, the information including cache size configuration information,
    detect a caching state of the caching node based on the cache size configuration information, and
    transmit, to the apparatus where the caching node is located, a cache indicating parameter indicating the caching node to delete previous data and to cache data when the caching capability of the apparatus is not enough based on the caching state of the caching node.

17. The network entity of claim 16, wherein the cache indicating parameter is determined based on a data property parameter and the information on the caching capability, and
  wherein the data property parameter includes at least one of a popularity of data, a size of data, and a life cycle of data.

18. The network entity of claim 16, wherein the controller is configured to:
  update a data list cached in the caching node according to newly cached data and the deleted previous data.

19. The network entity of claim 16, wherein the apparatus where the caching node is located is a base station or a user equipment (UE).

20. The network entity of claim 16, wherein the controller is configured to:
  receive, from the apparatus where the caching node is located, a connection request message including a service ID of requested data, and
  transmit, to the apparatus where the caching node is located, a connection establishment message indicating that the requested data has been cached in the caching node.

* * * * *